(12) United States Patent
Kandekar et al.

(10) Patent No.: US 8,434,001 B2
(45) Date of Patent: Apr. 30, 2013

(54) SYSTEMS AND METHODS FOR PRESENTING A CONTENT SUMMARY OF A MEDIA ITEM TO A USER BASED ON A POSITION WITHIN THE MEDIA ITEM

(75) Inventors: Kunal Kandekar, Jersey City, NJ (US); Scott Curtis, Durham, NC (US); Ravi Reddy Katpelly, Cary, NC (US)

(73) Assignee: Rhonda Enterprises, LLC, Wilmington, DE (US)

( * ) Notice: Subject to any disclaimer, the term of this patent is extended or adjusted under 35 U.S.C. 154(b) by 55 days.

(21) Appl. No.: 13/105,856

(22) Filed: May 11, 2011

(65) Prior Publication Data

US 2012/0210203 A1 Aug. 16, 2012

Related U.S. Application Data

(60) Provisional application No. 61/350,965, filed on Jun. 3, 2010.

(51) Int. Cl.
*G06F 17/00* (2006.01)
*G06F 17/30* (2006.01)

(52) U.S. Cl.
USPC ........... 715/234; 715/201; 715/205; 715/254; 715/256; 715/273; 707/602; 707/763

(58) Field of Classification Search .......... 715/200–209, 715/226, 231, 232, 234, 243–245, 253–255, 715/273, 210, 256, 700, 760; 707/602, 621, 707/705, 713, 763, 805, 821, 913, 917, 999.001, 707/E17.139
See application file for complete search history.

(56) References Cited

U.S. PATENT DOCUMENTS 5,146,552 A 9/1992 Cassorla et al.
5,297,039 A 3/1994 Kanaegami et al.
(Continued)

FOREIGN PATENT DOCUMENTS

KR 1020070077174 A 7/2007
KR 1020100099925 A 9/2010

OTHER PUBLICATIONS

Chang, B.-W. and Ungar, D., "Animation: From Cartoons to the User Interface," The SML Technical Report Series, Mar. 1995, copyright 1995, Sun Microsystems, Inc., SMLI-TR-95-33, found at <http://labs.oracle.com/techrep/1995/smli_tr-95-33.pdf>, originally published in UIST '93: User Interface Software and Technology, Nov. 1993, 18 pages.

(Continued)

*Primary Examiner* — Maikhanh Nguyen
(74) *Attorney, Agent, or Firm* — Olive Law Group, PLLC

(57) ABSTRACT

Systems and methods for presenting a content summary of a media item to a user based on a position within the media item are disclosed herein. According to an aspect, a method may include receiving identification of a position within a media item residing on an electronic device. For example, the identified position may be a bookmarked position within an e-book residing on an e-book reader. The method may also include generating a content summary for a portion of the media item based on the identified position. For example, an electronic device may dynamically generate a content summary based on content of the e-book that precedes a bookmarked position. The method may also include presenting the content summary to a user of the electronic device. For example, a display of an electronic device may be controlled to present a content summary to a reader of an e-book.

25 Claims, 11 Drawing Sheets

U.S. PATENT DOCUMENTS

| | | | |
|---|---|---|---|
| 5,640,552 | A | 6/1997 | Yianilos |
| 5,731,805 | A | 3/1998 | Tognazzini et al. |
| 6,243,071 | B1 | 6/2001 | Shwarts et al. |
| 6,992,687 | B1 | 1/2006 | Baird et al. |
| 7,103,848 | B2 * | 9/2006 | Barsness et al. ............. 715/776 |
| 7,158,971 | B1 | 1/2007 | Bascom |
| 7,158,983 | B2 | 1/2007 | Willse et al. |
| 7,185,001 | B1 | 2/2007 | Burdick et al. |
| 7,236,966 | B1 | 6/2007 | Jackson et al. |
| 7,437,023 | B2 | 10/2008 | King et al. |
| 7,594,187 | B2 | 9/2009 | Baird et al. |
| 7,716,077 | B1 | 5/2010 | Mikurak |
| 7,716,224 | B2 | 5/2010 | Reztlaff, II et al. |
| 2003/0014674 | A1 * | 1/2003 | Huffman et al. ............. 713/300 |
| 2003/0193523 | A1 | 10/2003 | Johnson |
| 2005/0198070 | A1 | 9/2005 | Lowry |
| 2005/0246391 | A1 | 11/2005 | Gross |
| 2006/0004704 | A1 | 1/2006 | Gross |
| 2006/0125846 | A1 | 6/2006 | Springer et al. |
| 2006/0156222 | A1 | 7/2006 | Chi et al. |
| 2006/0173985 | A1 | 8/2006 | Moore |
| 2006/0194181 | A1 | 8/2006 | Rosenberg |
| 2007/0025189 | A1 | 2/2007 | Wang et al. |
| 2007/0150456 | A1 | 6/2007 | Lian et al. |
| 2007/0168413 | A1 | 7/2007 | Barletta et al. |
| 2007/0219968 | A1 * | 9/2007 | Frank ................................ 707/3 |
| 2007/0296556 | A1 | 12/2007 | Wang et al. |
| 2008/0010262 | A1 * | 1/2008 | Frank ................................ 707/3 |
| 2008/0010273 | A1 * | 1/2008 | Frank ................................ 707/5 |
| 2008/0010605 | A1 * | 1/2008 | Frank ............................ 715/765 |
| 2008/0040313 | A1 | 2/2008 | Schachter |
| 2008/0079692 | A1 * | 4/2008 | Liang et al. ................... 345/156 |
| 2008/0141117 | A1 | 6/2008 | King et al. |
| 2008/0231644 | A1 * | 9/2008 | Lempel et al. ................ 345/689 |
| 2008/0243788 | A1 | 10/2008 | Reztlaff et al. |
| 2009/0077658 | A1 | 3/2009 | King et al. |
| 2009/0083613 | A1 | 3/2009 | Davis |
| 2009/0254572 | A1 | 10/2009 | Redlich et al. |
| 2010/0076274 | A1 | 3/2010 | Severson |
| 2010/0092095 | A1 | 4/2010 | King et al. |
| 2010/0094878 | A1 | 4/2010 | Soroca et al. |
| 2010/0174980 | A1 | 7/2010 | Mansfield et al. |
| 2010/0195975 | A1 | 8/2010 | Issa et al. |
| 2011/0066965 | A1 * | 3/2011 | Choi ............................. 715/776 |
| 2011/0087955 | A1 * | 4/2011 | Ho et al. ....................... 715/776 |
| 2012/0078612 | A1 | 3/2012 | Kandekar et al. |
| 2012/0078613 | A1 | 3/2012 | Kandekar et al. |
| 2012/0079372 | A1 | 3/2012 | Kandekar et al. |
| 2012/0206472 | A1 | 8/2012 | Kandekar et al. |

OTHER PUBLICATIONS

Graesser, A. et al., "Latent Semantic Analysis Captures Causal, Goal-oriented, and Taxonomic Structures," Proc. Int. Conf. CogSci '00, Philadelphia, Pennsylvania, Aug. 13-15, 2000, found at <http://citeseerx.ist.psu.edu/viewdoc/download?doi=10.1.1.23.5444&rep=rep1&type=pdf>, 6 pages.

Hearst, Marti A., "TextTiling: Segmenting Text into Multi-paragraph Subtopic Passages," Computational Linguistics, vol. 23, No. 1, pp. 33-64, Mar. 1997, copyright 1997, Association for Computational Linguistics, 32 pages.

Hon, Dan, "The future is Movie OS," posted Apr. 16, 2010, Extenuating Circumstances weblog, found at <http://danhon.com/2010/04/16/the-future-is-movie-os/>, printed Oct. 26, 2011, 21 pages.

"Illinois Named Entity Tagger," found at <http://cogcomp.cs.illinois.edu/page/software_view/4> on Internet Archive, dated Sep. 7, 2010, copyright 2010, University of Illinois at Urbana-Champaign, printed Oct. 26, 2011, 1 page.

"Named entity recognition," Wikipedia, found at <http://en.wikipedia.org/wiki/Named_Entity_Recognition> on Internet Archive, dated Oct. 19, 2010, page last modified Sep. 23, 2010, printed Oct. 26, 2011, 3 pages.

Pasca, Marius, "Organizing and Searching the World Wide Web of Facts—Step Two: Harnessing the Wisdom of the Crowds," WWW 2007, May 8-12, 2007, Banff, Alberta, Canada, 10 pages.

Ratinov, L. and Roth, D., "Design Challenges and Misconceptions in Named Entity Recognition," Proceedings of the Thirteenth Conference on Computational Natural Language Learning (CoNLL), Boulder, Colorado, Jun. 2009, pp. 147-155, copyright 2009, Association for Computational Linguistics, found at <http://cogcomp.cs.illinois.edu/papers/RatinovRo09.pdf>, 9 pages.

"RunPee.com," found at <http://runpee.com/> on the Internet Archive, dated Nov. 2, 2009, printed Nov. 11, 2011, 1 page.

Thangamani, M. et al., "Integrated Clustering and Feature Selection Scheme for Text Documents," Journal of Computer Science, vol. 6, No. 5, pp. 536-541, copyright 2010, Science Publications, 6 pages.

"Wireless, Whispernet and Whispersync," found at <http://www.amazon.com/gp/help/customer/display.html?nodeId=200375890&#syncing> on Internet Archive, dated Oct. 10, 2009, printed Oct. 26, 2011, 10 pages.

International Search Report and Written Opinion for PCT/US2011/053660, dated Apr. 27, 2012, International Searching Authority, Korean International Property Office, 14 pages.

Time-Based Hypermedia Processing and Pattern System, Rui Lopes, Dept. de Informatica, Faculdade de Ciencias da Universidade de Lisboa, Portugal, Jun. 2006.

* cited by examiner

SYSTEMS AND METHODS FOR PRESENTING A CONTENT SUMMARY OF A MEDIA ITEM TO A USER BASED ON A POSITION WITHIN THE MEDIA ITEM

CROSS REFERENCE TO RELATED APPLICATION

This application claims the benefit of U.S. provisional patent application No. 61/350,965, filed Jun. 3, 2010, the content of which is hereby incorporated herein by reference in its entirety.

TECHNICAL FIELD

The present disclosure relates to systems and methods for presenting media and associated information to electronic device users.

BACKGROUND

Electronic books, or e-books, are text and image-based publications in digital form produced on, published by, and readable on computers or other electronic devices. E-books are often read on dedicated hardware devices, such as e-book readers or e-book devices. Personal computers, mobile devices, such as smart phones, and other suitable devices may also be used for reading e-books.

Many currently available e-book readers and other devices allow users to mark and persist their current position in an e-book. For example, a user may interact with the device to bookmark a current position in an e-book. When the e-book is later opened on the device, the user can use the bookmark to quickly return to the position for continuing to read the e-book. Although bookmarks can be used to remind the user of the last reading position, a significant amount of time may have passed since the user last opened the e-book. In these cases, the user may have forgotten much of the previously read content of the e-book. Accordingly, it is desirable to provide techniques for refreshing a user's memory about an e-book's content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for presenting a content summary of a media item to a user based on a position within the media item. According to an aspect, a method may include receiving identification of a position within a media item residing on an electronic device. For example, the identified position may be a bookmarked position within an e-book residing on an e-book reader. The method may also include generating a content summary for a portion of the media item based on the identified position. For example, an electronic device may dynamically generate a content summary based on content of the e-book that precedes a bookmarked position. In another example, an electronic device may use a pre-generated summarization for generating a content summary of a portion of an e-book that precedes a bookmarked position. The method may also include presenting the content summary to a user of the electronic device. For example, a display of an electronic device may be controlled to present a content summary to a reader of an e-book.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1:
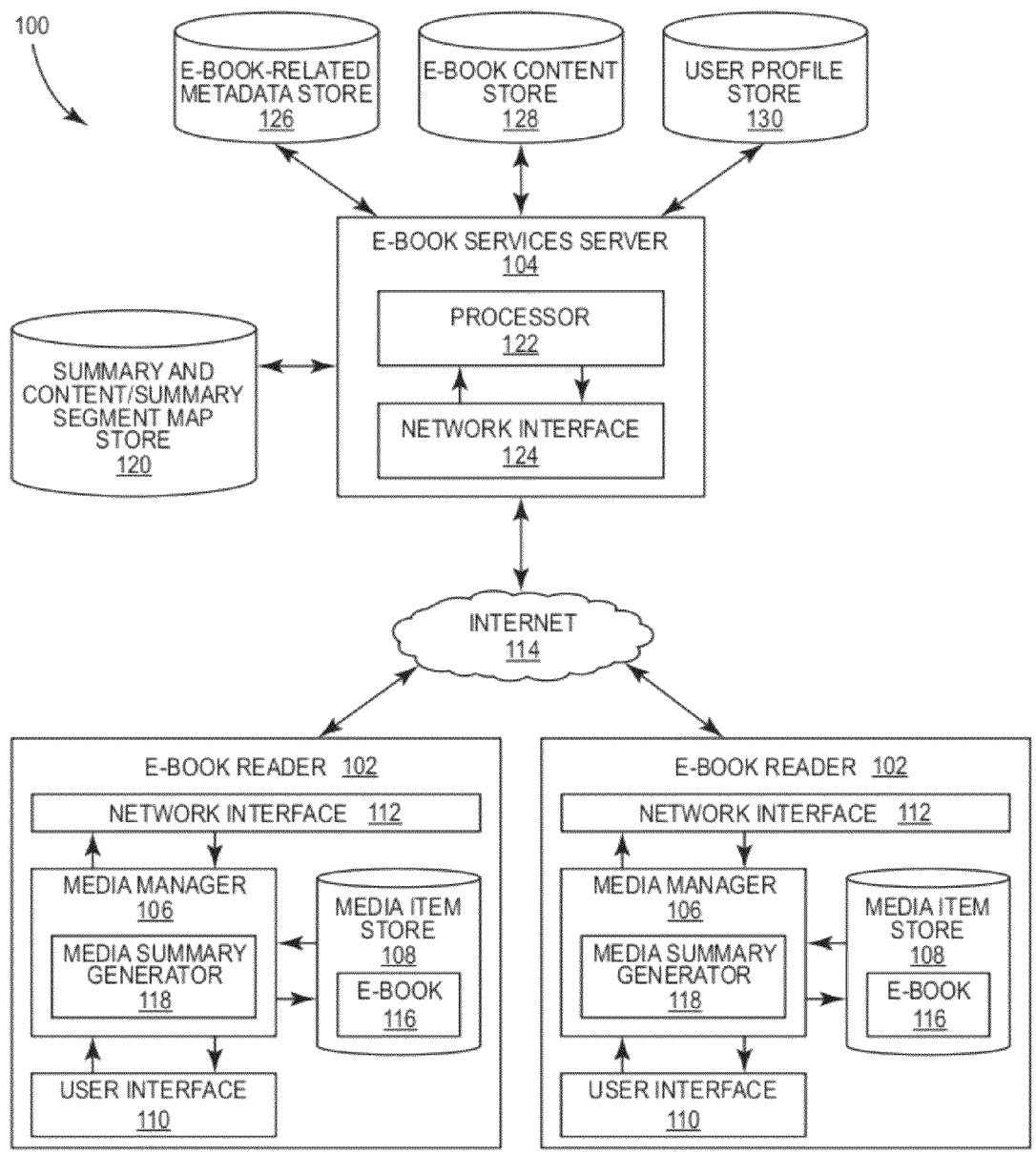
FIG. 1 is a schematic diagram of a system for presenting a content summary to a user of an electronic device according to embodiments of the present disclosure.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Embodiments of the present disclosure enable an electronic device, such as an e-book reader, to identify or receive identification of a position within a media item residing on the electronic device, to generate a content summary for a portion of the media item based on the identified position, and to present the content summary to a user of the electronic device. For example, an e-book reader may identify a bookmarked position within an e-book, generate a content summary for a portion of the e-book that precedes the bookmarked position, and display the content summary to a reader. Other embodiments of the present disclosure enable the electronic device to generate a content summary based on user-specific information or time since the user last read or accessed the media item.

As referred to herein, the term "electronic device" should be broadly construed. It can include any type of device capable of presenting a media item to a user. For example, the electronic device may be an e-book reader configured to present an e-book to a user. Example e-book readers include, but are not limited to, the KINDLE® and NOOK® e-book readers. In another example, an electronic device may be a mobile device such as, for example, but not limited to, a smart phone, a cell phone, a pager, a personal digital assistant (PDA, e.g., with GPRS NIC), a mobile computer with a smart phone client, or the like. An electronic device can also include any type of conventional computer, for example, a desktop computer or a laptop computer. A typical mobile device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or microbrowsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on an e-book reader, the examples may similarly be implemented on any suitable electronic device, such as a computer or smart phone.

As referred to herein, the term "media item" should be broadly construed. For example, a media item can include electronic text residing on an electronic device. Example text can be presented and stored in the form of book pages that may be browsed using an electronic device. The text may be stored in any suitable format, such as, but not limited to, portable document format (PDF), hypertext markup language (HTML), extensible markup language (XML), EPUB, or any suitable e-book or word processing format. In another example, a media item can include image, video, and audio content.

As referred to herein, a "user interface" is generally a system by which users interact with an electronic device. An interface can include an input for allowing users to manipulate an electronic device, and can include an output for allowing the system to present information (e.g., e-book content) and/or data, indicate the effects of the user's manipulation, etc. An example of an interface on an electronic device includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of an electronic device and can be selected by and interacted with by a user using the interface. In an example, the display of the electronic device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

Operating environments in which embodiments of the present disclosure may be implemented are also well-known. In a representative embodiment, a mobile electronic device, such as an e-book reader, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, embodiments in accordance with the present disclosure may be implemented in other and next-generation mobile networks and devices as well. The mobile device is the physical equipment used by the end user, typically a subscriber to the wireless network. Typically, a mobile device is a 2.5G-compliant device, 3G-compliant device, or 4G-compliant device that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The electronic device may also include a memory or data store.

The presently disclosed subject matter is now described in more detail. For example, FIG. 1 illustrates a schematic diagram of a system 100 for presenting a content summary to a user of an electronic device according to embodiments of the present disclosure. Referring to FIG. 1, the system 100 includes e-book readers 102 and an e-book services server 104. The e-book readers 102 may be any type of electronic device capable of presenting media item content to a user. Further, the e-book readers 102 comprise a number of functional components. This representation of the e-book readers 102 is meant to be for convenience of illustration and description, and it should not be taken to limit the scope of the present disclosure as one or more functions may be combined. Typically, these components are implemented in software (as a set of process-executable computer instructions, associated data structures, and the like). One or more of the functions may be combined or otherwise implemented in any suitable manner (e.g., in hardware, in firmware, in combined hardware and software, or the like). The e-book readers 102 may include a media manager 106 for managing storage of one or more media items in a media item store 108 and for controlling presentation of a media item to a user. The e-book readers 102 may include a user interface 110 capable of receiving user input and of presenting content to a user. For example, the user interface 110 may include a display capable of presenting e-book content to a user. The media item store 108 may be a suitable memory device.

The e-book readers 102 may also be capable of communicating with other devices. For example, the e-book readers 102 may include a network interface 112 capable of communicating with the server 104 via the Internet 114 or any other suitable network, such as a wireless network or local area network (LAN). In another example, the e-book readers 102 can be Internet-accessible and can interact with the server 104 using Internet protocols such as HTTP, HTTPS, and the like. The server 104 is shown as a single device but this is not a requirement, whereas one or more programs, processes, or other code may comprise the server and be executed on one or more machines in one or more networked locations. The e-book readers 102 may also be capable of communicating with one another or another electronic device via the Internet 114 or another suitable network.

The operation of the system can be described by the following example. As shown in FIG. 1, the e-book readers 102 include various functional components and associated data stores to facilitate the operation. The operation of the disclosed methods may be implemented using system components other than as shown in FIG. 1.

Figure 2:
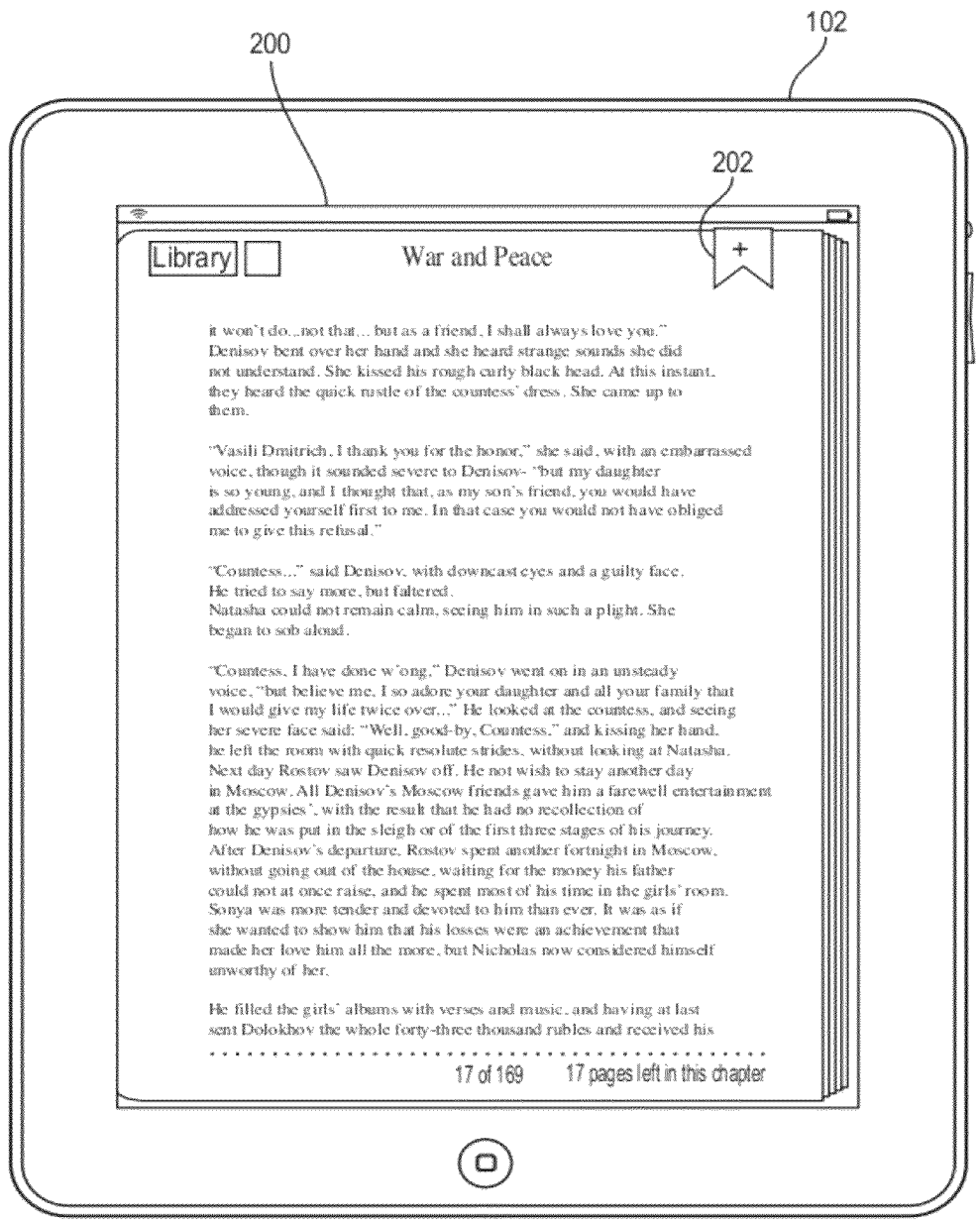
FIG. 2 is a front view of an e-book reader displaying content of an e-book via its display in accordance with embodiments of the present disclosure.

A user of one of the e-book readers 102 may use an application (often referred to as an "app") residing on the e-book reader 102 to interact with an e-book 116 stored in the media item store 108. The application may reside on the e-book reader 102 and be a part of the media manager 106. The user may, for example, input commands into the user interface 110 for opening the e-book 116 and for interacting with the e-book 116. The application may present text and/or images of the e-book 116 to the user via a display of the user interface 110. For example, FIG. 2 illustrates a front view of an e-book reader 102 displaying content of an e-book via its display 200 in accordance with embodiments of the present disclosure. In this example, the display 200 is a touch screen display. The user may suitably interact with the e-book reader 102 to control the display of different portions of the e-book's content. For example, the user may touch the display 200, such as by use of a "swiping" motion on the surface of the display 200, to command the media manager 106 to "turn" pages of the e-book as will be understood. The user may turn or otherwise select pages for display by any other suitable technique as will be understood. Graphic 202 indicates that the displayed page is a bookmark location.

In another example, the user may interact with the display 200 for selecting one or more portions of the e-book. The user may select a portion of the e-book by touching or swiping a desired portion of the e-book displayed to the user. For example, the user may touch or swipe a word, one or more paragraphs, or the entirety of a displayed page for selecting that portion of the display. The user may turn or otherwise select pages for display by any other suitable technique as will be understood. The selected portion of the e-book may identify a position within the e-book. The media manager 106 may receive identification of the selected portion and, in response, bookmark the corresponding position within the e-book. As a result, when later opening the e-book, the user may be able to quickly return to the bookmarked position to continue reading the e-book.

Figure 3:
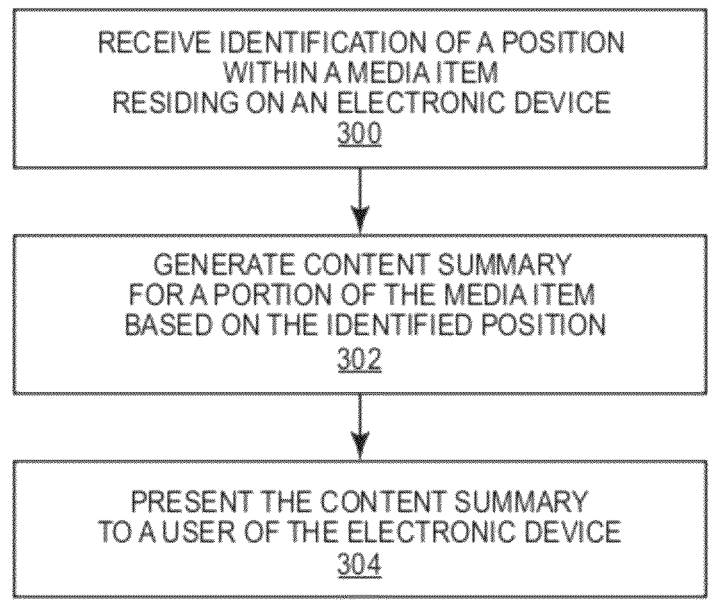
FIG. 3 is a flow chart of an exemplary method for presenting a content summary of a media item to a user of an electronic device in accordance with embodiments of the present disclosure.

In accordance with embodiments of the present disclosure, FIG. 3 illustrates a flow chart of an exemplary method for presenting a content summary of a media item to a user of an electronic device. The method of FIG. 3 is described with respect to the example system 100 shown in FIG. 1, although the method may be implemented by any suitable system or electronic device. The steps of FIG. 3 may be implemented entirely, or in part, by a media summary generator 118 residing on one of the e-book readers 102 shown in FIG. 1. The media summary generator 118 may be implemented by software, hardware, firmware, or combinations thereof.

Referring to FIG. 3, the method includes receiving identification of a position within a media item residing on an electronic device (step 300). For example, the identified position may be a bookmarked position within text of the e-book 116. In this example, the position may be identified in response to a user interacting with the user interface 110 to input a command for bookmarking the position within the e-book 116. Examples of identifiers for a position within an e-book include, but are not limited to, a chapter title, chapter number, page number, line number, column number, or combinations thereof. Alternatively, the position identifier may also include indexes into the data structures representing the e-book 116, such as file offsets, memory locations, traversal paths in Document Object Model (DOM) trees, or anchor tags in HTML. The media manager 106 may manage bookmarking functions and may report identification of a bookmarked position to the media summary generator 118. Position identifiers may be stored in the media item store 108, and may be associated with a corresponding e-book residing in the store 108. In one embodiment, position identifiers may alternatively, or in addition, be stored on the server 104, for example, or along with the user's user profile record in the user profile store 130.

In another example of identifying a position within a media item, the position may be identified in response to the media item being closed. In this example, a media item may be opened at a particular position when the user has previously inputted control commands for closing the media item. Alternatively, or in addition, the e-book reader itself, or a component such as the media manager 106, may issue control commands for closing the media item, for example, triggered by timeouts due to lack of user activity. In response to closing the media item, the current position or near the current position is identified and stored. Using the example of the e-book 116, the e-book reader 102 may be displaying a specific page of an e-book when the user inputs commands to close the e-book. In response to receipt of the commands, the media summary generator 118 may identify the current page of the e-book 116 and may store an identifier of the page in the media item store 108.

At step 302 of FIG. 3, the method includes generating a content summary for a portion of the media item based on the identified position. For example, the content summary may be generated based on a bookmarked position within an e-book. The content summary may also be based on the bookmarked position along with other factors as described herein. Further, for example, the content summary may be generated based on a bookmarked position or other identified position within an e-book, a user profile, time elapsed since the user last accessed a media item, or combinations thereof. In the example of the e-book reader 102, the bookmarked position may be identified as a chapter or page in the e-book 116. In this example, the e-book reader 102 may have stored in the media item store 108 one or more content summaries for the e-book 116. One of the content summaries may correspond to the identified chapter and may include text that summarizes the text of the e-book 116 up to the identified chapter or page. The media summary generator 118 may use a chapter identifier, page identifier, or another position identifier for accessing content summaries stored in the media item store 108. A content summary corresponding to the identifier may be used for looking up and accessing a corresponding content summary. In another embodiment, a summary may be dynamically generated by applying automated techniques, such as, but not limited to, semantic analysis, natural language processing and automatic summary generation, to the portion of the content based on the position identifier. Such automated summarization techniques are understood by those of skill in the art, and may include extraction as well as abstraction techniques, key-phrase extraction, document summarization, statistical methods, supervised or unsupervised learning techniques, and the like.

In an example of generating a content summary, the content summary may be generated based on user-specific information. For example, the media summary generator 118 may receive or gather information about a user that has accessed or opened the e-book 116. The information may include a profile of the user, gaze-tracking information for the user, annotations of the user, social network information of the user, the like, or combinations thereof. The media summary generator 118 may use this information for generating a content summary for a media item, such as the e-book 116, in accordance with embodiments of the present disclosure.

In one embodiment, the demographic information of a user may be used to generate the content summary. As an example, the gender and age of the user may be used along with heuristics to infer which aspects of the content may interest the user more than other aspects, and hence may be used to bias the summary towards those aspects. As an example, the content summary of a narrative text may include, in addition to the main summary, for adult female users, events or actions of primary female characters, whereas for adult male users, the summary may be biased more towards the events or actions of primary male characters, on the premise that users may relate more to characters of their own gender. For readers of a different age, the bias may be reversed. In another embodiment, other information from a user profile, such as interests, preferences, content history and content engagement, may be used to customize the generated summary by inferring the relevance of segments of the summary to the user. This information may be stored in the user profile as a set of keywords, key-phrases, genres, names of authors, or other such metadata. For example, by applying keyword matching between segments from the generated summary and the keywords in a user profile, segments with greater keyword matching may be determined to be more relevant. In another embodiment, the preferences and keywords from a user profile may be mapped to an ontology, and matching words or phrases in content segments to the same ontology may be used to determine the relevance of content segments to the user, and this relevance can be used to generate a summary customized for the user.

As another example, for a deeply technical content item, gaze tracking or other methods of determining user-engagement may be used to identify segments that the user has more difficulty understanding, such as by identifying the segments the user re-reads more than once, and then assigning such segments higher weight during the summary generation method. Customizing the generated content summary based on this determined relevance may include selecting sentences to be included in the summary based on relevance, filtering or de-emphasizing summary segments determined to be less relevant to the user, emphasizing summary segments that may be more relevant to the user, or replacing less relevant segments with more relevant segments that are located close to each other in the content. In an embodiment, extraction-based methods are used for summary generation, whereby content segments, such as passages, sentences, phrases or words are ranked or weighted based on a metric of how well they may be representative of other segments or sections of the content, and extracting them for inclusion in a summary based on a function of the rank or weight, such as by comparing to a threshold value. In this case, sentences or phrases to be selected for inclusion in a summary are weighted more or less based on whether they also contain terms or references that are related to the user's preferences. Hence, when the summary is generated, the highest weighted sentences or phrases are selected, thus resulting in a summary that is more relevant to the terms in a user profile.

In another embodiment, a user-specific content summary may be generated via query-biased summary generation, where the query includes terms that are of interest to the user. In yet another embodiment, pre-generated content summaries are provided for each segment of the content, and a summary is generated by combining the summary segments corresponding to the portion of the content identified by the position identifier. Each of these content summary segments may include metadata comprising: the keywords or ontological concepts that apply to that segment; rules or keywords relating to the types of user that each segment is most relevant to; a basic pre-assigned weight to be used for the segment during summary generation; and so on. Hence, when a summary is generated for the user, terms from a user profile may be matched with such metadata of each content summary segment to estimate the relevance of that segment to the user. Alternatively, other methods previously described, such as matching keywords in the pre-generated summary segments and the user profile may be used to estimate the relevance of the segments. This relevance may be used to determine whether that segment should be included in the generated summary. Note that any combination of the above methods may be used, and different methods may be used for different users or content types, such as for fiction versus non-fiction texts.

User profile information may be used as a factor for generating a content summary. By use of user profile information, information more relevant to the user may be identified. Example user profile information includes, but is not limited to, gender of a user, age of a user, gaze-tracking to identify a user's interests, sentiment analysis of user annotations and comments, and a user's social network activity. Relevance information may include, for example, but is not limited to, keywords based on the user profile, words the user focused on (e.g., based on gaze tracking), estimated character empathy (e.g., based on user demographics), and the like. Other example information in the user profile may include preferred genres, names of favorite authors and keywords, key-phrases or terms describing types of content, or other such metadata. Such information may either be provided manually by the user, or automatically inferred from multiple sources such as: analysis of previous content consumed, including textual, web, video and audio content; book reading behavior; web browsing history; social media generated; social network information; and so on. In addition, interests may also be inferred via methods measuring user engagement with a variety of content types, for example, via gaze tracking or determining the types of content the user annotates. Other information may include the user's preferences in summary generation, which may be manually configured by the user, or inferred by analysis of the user's reading behavior. As an example, the user's reading behavior when resuming reading in the absence of a content summary may be analyzed. If the user spends more time reading through more recently read content, the summary generation process may assign more weight to summary segments corresponding to more recently read chapters. Alternately, if the user spends more time reading through less recently read content, the summary generation process may assign more weight to the earlier chapters.

In another example of generating a content summary, the content summary may be generated based on a time elapsed since the user last accessed a media item. For example, the e-book reader 102 may have stored in the media item store 108 one or more content summaries for the e-book 116. The lengths of the content summaries may vary, where longer content summaries include a higher level of detail as compared to shorter content summaries. The media summary generator 118 may compare an elapsed time since the user last accessed the e-book 116 to one or more thresholds. One of the content summaries may be selected based on the comparison. In response to determining that the elapsed time is greater than a threshold, a content summary having a high level of detail or greater amount of description may be selected for use in refreshing the user's memory. It is reasoned that if it has been a long time since a user last accessed an e-book, then a greater amount of summary detail may be needed to refresh the user's memory. Conversely, in response to determining that the elapsed time is less than a threshold, a content summary having a low level of detail may be selected, since only a low level of detail may be needed to refresh the user's memory.

Further, regarding use of a time elapsed since user access of a media item, the media summary generator 118 may track the amount of time a user took for reading content segments (e.g., chapters) of an e-book, and/or may track the time elapsed since the user has read each content segment. For example, a user's activity may include, in the following sequence: read chapter 1, take a break, read chapter 2, take a break, and so on until chapter 6. After chapter 6, the user may take a long break and input a command for the content up to chapter 6 to be summarized. The media summary generator 118 may generate a summary having an increased level of detail for chapter 1, less for chapter 3, and so on until the summary is the shortest for chapter 6. In another embodiment, the rules may be reversed, on the premise that the immediate content preceding the user's current position is more important to provide a more complete context. Hence, a more detailed summary may be generated for the most recently read segments, and a less detailed summary for the least recently read segments. In yet another embodiment, the rules may be mixed. For instance, the detail of the content summary may reduce with each successive segment, except for the most recently read segment, which may be needed to provide better context to the user's current position in the content. In yet another embodiment, the level of detail for different portions may be determined based on whether, or how often, the portion has been summarized and presented to the user on previous occasions. Specifically, the level of detail for a portion is inversely proportional to the number of times its summary has been previously presented to the user, so that the user need not read the same summary segments again and again every time the user resumes reading the e-book. As such, the media summary generator 118 may keep records, either on the e-book services server 104 or in the local storage 108, of which portions of the content have been summarized and presented to the user over time. These rules may be pre-configured or adapted based on one or more of the user's input commands, user-profile, user preferences, analysis of user reading behavior (such as past reading behavior when resuming reading), the type of content (such as fiction versus non-fiction), or rules based on metadata provided with pre-generated content summaries. The media summary generator 118 may set the level of detail for each chapter based on the time since the chapter was read.

In accordance with embodiments of the present disclosure, a user may select to present or display either a content summary with a high amount of description, or a content summary with less description. Both content summaries may be generated, and the user may enter input for selecting one of the two. In response to the selection, a display may be controlled for displaying the selected content summary. In another example, the selection may be based on an elapsed time since the user last accessed the e-book. In this example, if the elapsed time is greater than a threshold, the content summary with greater detail may be displayed. In contrast, if the elapsed time is less than a threshold, the content summary with less detail may be displayed. There may be more than two levels of content summaries for a portion of an e-book. The various levels of content summaries may have varying levels of detail that may be selectively presented. The summaries may be automatically generated or entered by a human.

In accordance with embodiments of the present disclosure, an extractive technique may be utilized in the creation of a content summary. For example, key phrases, words, and/or sentences in content may be identified and used in a summary for the content. The length of the content summary may be adapted by varying constraints or thresholds on the ranks or scores of phrases, words, and/or sentences in the content. Low ranking or scoring phrases, words, and/or sentences may be extracted, while others are used in the summary. Phrases, words, and/or sentences may be extracted from use in the summary based on a relevancy level assigned to the phrases, words, and/or sentences. As previously described, ranks or weights of the extracted phrases, words or sentences may also depend on the user profile. The threshold may be varied to change the length of the summary. For example, a short summary may include only phrases scoring in a top 10% of relevancy among all phrases in content of a portion of an e-book to be summarized. Further, for example, a long summary may include only phrases scoring in a top 20% of relevancy among all phrases in the content. Different thresholds or other constraints may be applied to different portions of content in an e-book. For example, variations in constraints may be linear or random based on a distance from an identified position, such as a bookmarked position, or based on the time elapsed since that portion has been read by the user.

In another example of generating a content summary, the content summary may be generated based on a portion of a media item residing between a beginning of the media item and an identified position, such as a bookmarked position or a position where the media item was closed. For example, a suitable summarization technique may be used to generate a summary of the portion residing between the beginning of the media item and the identified position. This technique may be combined with the determination of a time elapsed since the user last accessed a media item. The size of the portion of the media item that is summarized may be based on the elapsed time. For example, the media summary generator 118 may compare an elapsed time since the user last accessed the e-book 116 to one or more thresholds. The amount of content that is summarized may be determined based on the comparison. In response to determining that the elapsed time is greater than a threshold, a content summary may be generated based on multiple chapters or pages. Conversely, for example, in response to determining that the elapsed time is less than a threshold, a content summary may be generated based on only a single chapter or a few pages.

In accordance with embodiments of the present disclosure, any suitable technique may be utilized to summarize content of a media item. For example, the media summary generator 118 may apply a semantic analysis technique to a portion of the e-book 116 for generating a content summary. In another example, the media summary generator 118 may apply a natural language processing (NLP) technique to a portion of the e-book 116 for generating a content summary. Such summarization techniques may be used for summarizing content in accordance with embodiments of the present disclosure.

In accordance with embodiments of the present disclosure, a content summary may be dynamically generated in response to the opening of media content on an electronic device. For example, a user may use the user interface 110 to input a command for opening the e-book 116. In this example, the e-book 116 may be opened at a particular page or chapter, such as a bookmarked page or chapter. In response to receiving the user input to control the opening of the e-book 116, the media summary generator 118 may dynamically generate a content summary for a portion of the e-book 116 that corresponds to the position where the e-book 116 was opened. The content summary may be generated in accordance with embodiments of the present disclosure. In another embodiment of the present disclosure, a content summary may be generated via a background process as the user finishes reading each segment of the content, for instance, at the end of each chapter. Thus, the summary may be available for presentation at short notice any time the user resumes. Note that the background process may also continually or at intervals adapt the previously generated summary as a function of time elapsed.

In accordance with embodiments of the present disclosure, generation of a content summary may include retrieving a pre-generated summarization of the media content. For example, referring to FIG. 1, one of the e-book readers 102 may retrieve a pre-generated summarization of the media content from the e-book services server 104. In this example, the summarization of the e-book 116 may be stored in a summary and content/summary segment map store 120, which may be a database server. The e-book reader 102 may request the summarization from the server 104 via the Internet 114. In response to the request, the server 104 may access the store 120 for obtaining the summarization for the e-book 116. Next, the server 104 may communicate the summarization to the e-book reader 102 that requested the summarization. Alternatively, the pre-generated summarization may be retrieved from another source or retrieved from the media item store 108.

The pre-generated summarization may be truncated and presented to a user in accordance with embodiments of the present disclosure. For example, a user of the e-book reader 102 may be presented with a pre-generated summarization of the e-book 116. Further, the pre-generated summarization may be truncated based on a position within the e-book 116. For example, the pre-generated summarization may be truncated based on an identified position with the e-book 116, such as a bookmarked position. The media summary generator 118 may truncate the pre-generated summarization by identifying a portion of the summarization that corresponds to the identified position. The portion of the summarization may be identified by use of a mapping that maps the summarization to the identified position. The mapping may map portions of the pre-generated summarization to various portions of the media item that are relevant to the content summary. The mapping may be retrieved from, for example, the store 120 or the local store 108. The truncated summarization may then be presented to a user. In this way, the user is only provided with the part of the summarization that corresponds to his or her position within the e-book 116.

In an example, a mapping may include, along with a summary, metadata and/or annotations for indicating which portion of a summary corresponds to which portion of content of an e-book. The metadata or annotations may be human-generated or automatically generated by comparing keywords or syntactic parses and/or semantic analysis of the summary with that of the content.

At step 304 of FIG. 3, the method includes presenting the content summary to a user of the electronic device. For example, a content summary associated with a current position of the user may be displayed by use of a display. In the example of FIG. 1, a content summary of a bookmarked position of the e-book 116 may be presented to the user by use of a display of the user interface 110. The display of the content summary may include displaying text of the content summary, an identifier for the position in the media item that is associated with the content summary, other text as described herein, suitable graphics or images, and combinations thereof.

Referring to FIG. 1, the e-book services server 104 may be any type of server capable of communicating with electronic devices and providing information to the electronic devices. The server 104 may include a number of functional components. This representation of the server 104 is meant to be for convenience of illustration and description, and it should not be taken to limit the scope of the present disclosure as one or more functions may be combined. Typically, these components are implemented in software (as a set of process-executable computer instructions, associated data structures, and the like). One or more functions may be combined or otherwise implemented in any suitable manner (e.g., in hardware, in firmware, in combined hardware and software, or the like). The server 104 may include a processor 122 for implementing process-executable instructions. The server 104 may include a network interface 124 for communicating with the e-book readers 102 via the Internet 114 or any other suitable network.

The server 104 may have access to one or more database servers. For example, in addition to the store 120 described herein, the server 104 may have access to an e-book-related metadata store 126, an e-book content store 128, and a user profile store 130. The e-book-related metadata store 126 may store information about one or more e-books, such as, but not limited to, author name, publisher information, author biography, publishing date, editor information, genres and categorization information, pricing information, previews, excerpts, cover images, cover text, bibliographic information, copyright information, digital rights management (DRM) information, reviews, user comments, metadata such as number of words, chapters, pages and editions, target audience and reader demographics, and the like. The e-book content store 128 may contain e-books. The user profile store 130 may include profile information for readers of the e-books stored at the e-book content store 128. The information contained in the stores 120, 126, 128, and 130 may be accessible to the e-book readers 102 by request to the server 104. For example, the e-book readers 102 may request downloading of the content of the servers. The server 104 may access the stores for communicating the requested content to the e-book readers 102 in response to requests. The downloaded content may be used by the e-book readers 102 for generating content summaries in accordance with embodiments of the present disclosure.

Figure 4A:
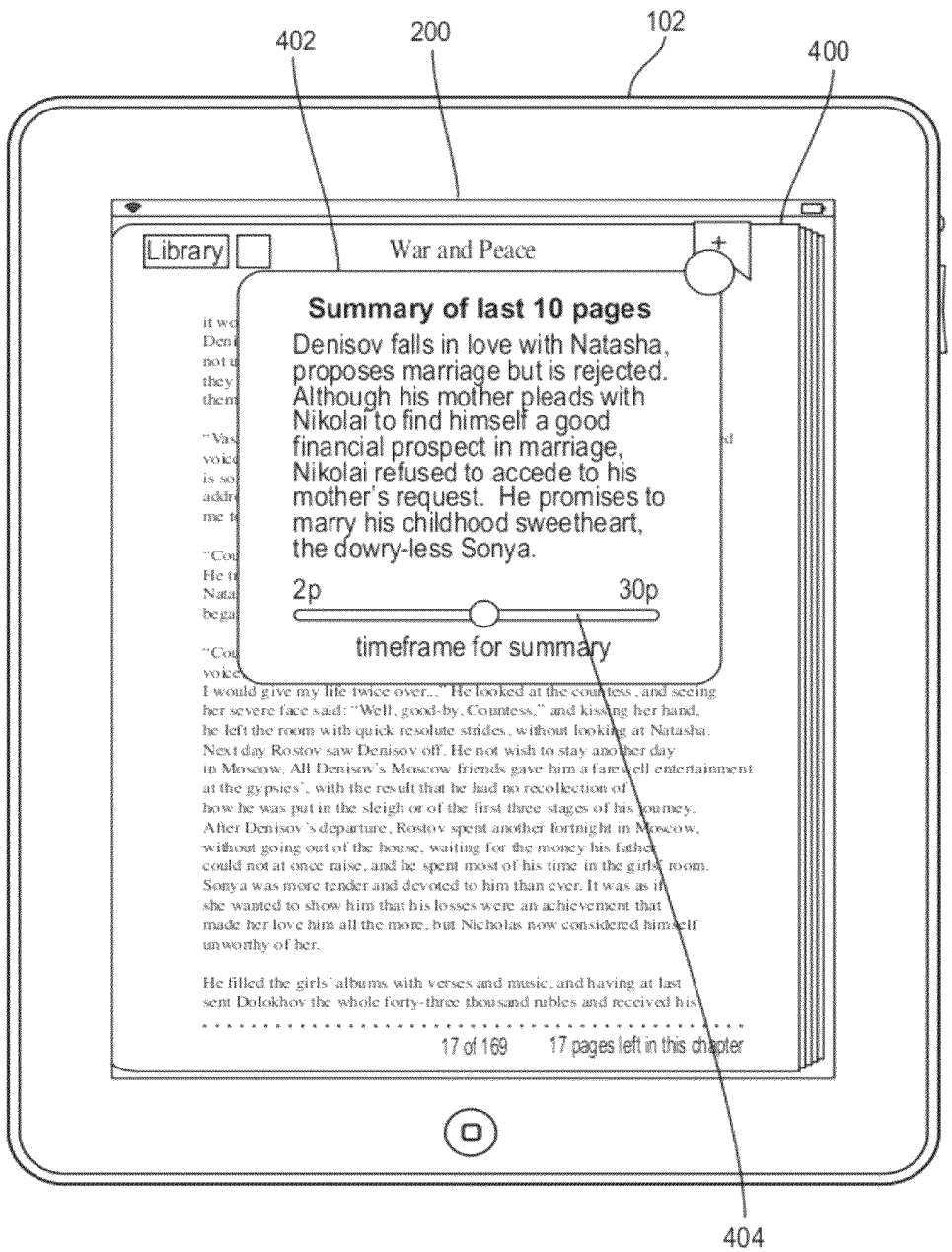
FIG. 4A is a front view of an e-book reader displaying content of an e-book and a content summary of the e-book via a display in accordance with embodiments of the present disclosure.

FIG. 4A illustrates a front view of an e-book reader 102 displaying content of an e-book and a content summary of the e-book via the display 200 in accordance with embodiments of the present disclosure. Referring to FIG. 4A, the e-book reader 102 is displaying text of a page 400 of an e-book. The text of the page 400 may be displayed within a window. The content summary may be displayed at or near the corresponding content. For example, text of a content summary corresponding to the displayed page 400 may be displayed within another window 402 positioned over the window display of the page 400 of the e-book. The content summary may be a summary of the 10 pages preceding the displayed page 400, which may be a bookmarked page.

The window 402 may also display a graphical user interface (GUI) object 404 that may be user-controlled for selecting a portion of the e-book for content summarization display. In this example, the object 404 is a scrollbar that may be controlled for selecting a number of pages preceding the currently displayed page of the e-book. In response to the selection, the window 402 may display a content summary for the selected number of pages preceding the currently displayed page. Any other suitable user input may be used for selecting a portion of an e-book for content summarization display. For example, the user may enter input identifying a range of pages in the e-book for summarization and display. In another embodiment, the GUI object 404 may be adapted to control the level of detail of the generated summary. Note that this is only one of many possible embodiments for displaying a summary. In one alternate embodiment, more dynamic and visually appealing methods may be employed, such as animated navigation to the bookmark position by displaying e-book pages automatically flipping to the bookmarked page. In this embodiment, displaying the generated content summary to the user may be effected by emphasizing the summary segments, such as key phrases and sentences that are extracted as part of the summary, on the pages that the selected segments appear on as the page flips by in the animation. Emphasizing extracted summary segments may comprise highlighting the segments on the page, de-emphasizing the non-summary text around the summary segments, or a combination of both. Emphasis or de-emphasis may be achieved by, for example, changing the font type, color, characteristics (bold, italics) and size of the text of the summary segment. In addition, the page-flipping animation may be controlled to better display the summary by adapting the flipping rate to make the highlighted summary segments more visible, such as by pausing at, or slowing down the flipping of, the corresponding pages on which summary segments appear. Note that the multiple embodiments may be provided, and the exact embodiment for displaying summaries may be configurable by the user, or by metadata provided along with the e-book by the creators of the e-book or the e-book service 104. Also note that a summary may not be generated or presented to the user at all, for example, if it is determined that the time elapsed since the last session is below a threshold.

Figure 4B:
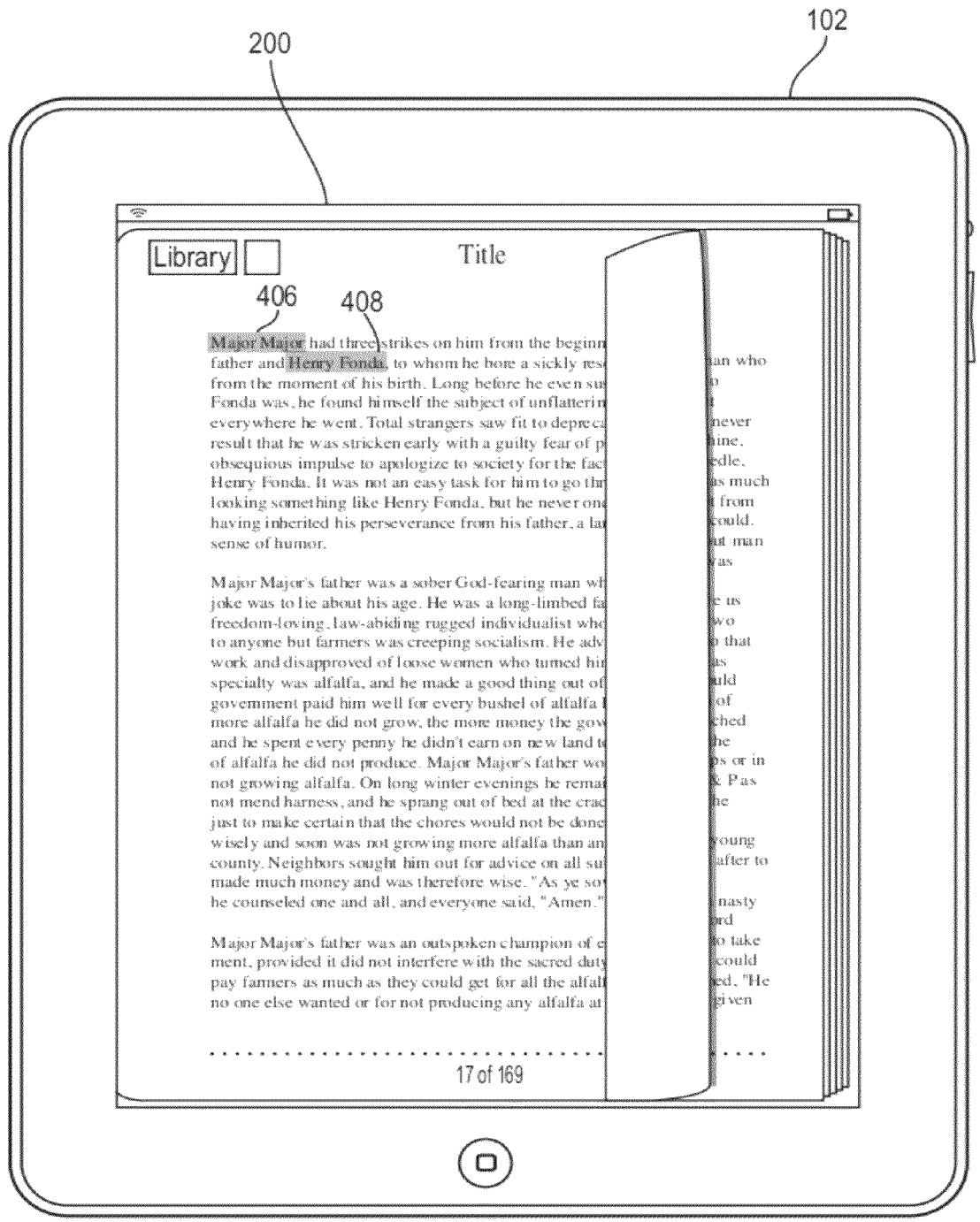
FIG. 4B illustrates a front view of an e-book reader displaying content of an e-book and a step in an dynamic summarization process via a display in accordance with embodiments of the present disclosure.

In another embodiment, FIG. 4B illustrates a front view of an e-book reader 102 displaying content of an e-book and a step in a dynamic summarization process via the display 200 in accordance with embodiments of the present disclosure. In this example, a reader may stop reading for a time and may bookmark the page at which he or she stopped. Later, the reader resumes reading and the media summary generator 118 may determine that the reader could benefit from a summary in response to determining that at least a predetermined time has passed since the reader last read the e-book. In this case, the media summary generator 118 may control the display 200 to generate an animation for summarizing content of the e-book up to the bookmarked location in the e-book. For example, the animation may include "flipping" the pages of the e-book rapidly and highlighting key sentences, names, keywords, and/or the like for quickly summarizing content that the reader has read thus far. For example, referring to FIG. 4B, the media summary generator 118 may recognize that the reader is about to enter a portion of the e-book that focuses heavily on a particular character. The reader's memory of this character may be refreshed by interleaving one or more significant facts about the character. In this example, the reader is reminded that the "Major Major," indicated by highlighting this text 406, looks a lot like the actor "Henry Fonda," indicated by highlighting the text 408. Such an animation may orient the reader both "spatially" and conceptually within the e-book. After one or more contextually relevant "conceptual" or "catch up" stops, the "flipping" of pages may stop at the bookmarked position with, for example, a virtual bookmark indicating an exact point where the reader stopped reading, such as detected by a gaze tracker.

Figure 5:
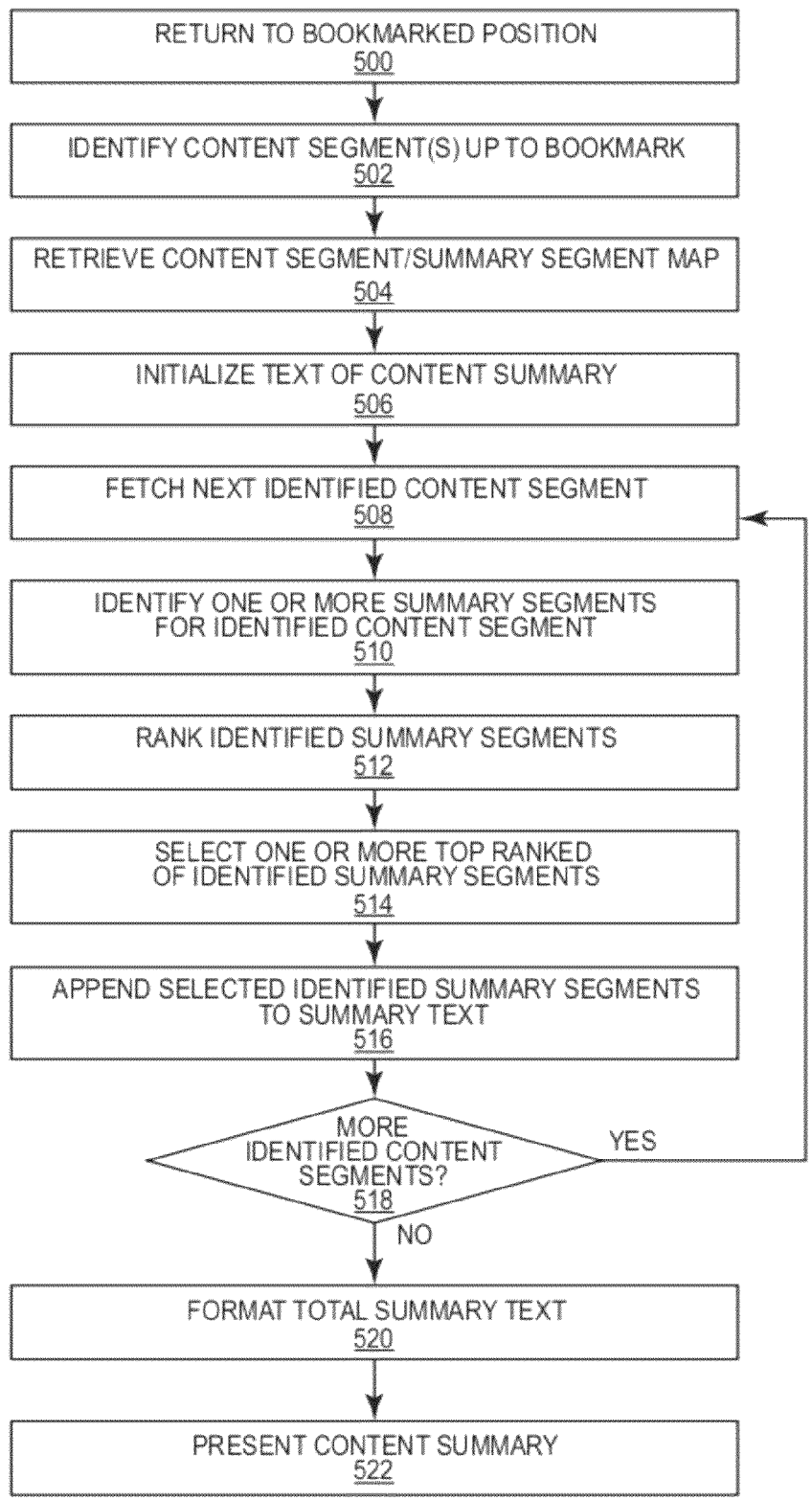
FIG. 5 is a flow chart of an exemplary method for generating a bookmark-based content summary using pre-generated summaries and a content segment/summary segment map in accordance with embodiments of the present disclosure.

In accordance with embodiments of the present disclosure, FIG. 5 illustrates a flow chart of an exemplary method for generating a bookmark-based content summary using pre-generated summaries and a content segment/summary segment map. The method of FIG. 5 is described with respect to the system 100 shown in FIG. 1, although the method may be implemented by any suitable system or electronic device. The steps of FIG. 5 may be implemented entirely, or in part, by a media summary generator 118 residing on one of the e-book readers 102 shown in FIG. 1. The media summary generator 118 may be implemented by software, hardware, firmware, or combinations thereof.

Referring to FIG. 5, the method includes returning to a bookmarked position within an e-book (step 500). For example, a user of one of the e-book readers 102 shown in FIG. 1 may enter an input command for opening the e-book 116 at a bookmarked page.

The method of FIG. 5 includes identifying one or more content segments up to the bookmarked position (step 502). For example, one or more pages or chapters in the e-book 116 may precede a bookmarked page. In this example, the media summary generator 118 may identify the pages or chapters preceding the bookmarked page.

The method of FIG. 5 includes retrieving a content segment/summary segment map (step 504). For example, the e-book reader 102 may retrieve a content segment/summary segment map from the store 120 shown in FIG. 1. Alternatively, for example, the map may be retrieved from a local data source, such as the store 108, where the map resides. The map may include a mapping between content segments of an e-book and pre-generated content summaries for the segments. For example, the map may include identifiers of chapters of the e-book 116, and a mapping between the chapter identifiers and content summaries for each identified chapter. Alternatively, for example, mappings can be provided between pages, paragraphs, or any other content segment and corresponding summaries for those segments. A content summary for a content segment, such as a chapter, may contain text that summarizes the content segment.

In an embodiment, there can be a one-to-one mapping between a content segment and a summary segment. As such, the map data structure is quite straightforward. In another embodiment, there may be a one-to-many mapping between a content segment and summary segments, where one content segment may map to multiple content segments of, for example, varying levels of detail. In yet another embodiment, there may be a one-to-one mapping between a content segment and summary segment, but the summary segment may comprise a more complex data structure that contains multiple versions of the same summary, such as versions with varying levels of detail. In another embodiment, the summary segment data structure may have a hierarchical or tree-like nature, whereby each level of the summary segment has multiple child levels, and each level may contain text corresponding to a different level of verbosity. For example, each subsequent level may contain a more detailed version of the level above, or may contain text that adds detail to the text of the level above. Alternatively, or in addition, each level may contain summary text that emphasizes a different aspect of the content. The hierarchical summary segment may also contain metadata describing the relationship between each parent level and child levels, as well as metadata containing keywords about the summary segment text. Such metadata could include, for example, relations such as "more detailed version of parent level", or "focusing more on a specific character X", or "more relevant to a reader demographic Y". Hence, summary generation for a given level of detail and a given user profile for a content segment may be performed by: traversing the different levels of the hierarchical summary segment for that content segment; matching the metadata of each level with the required detail and the user profile; identifying the level or levels having the best match; and selecting the summary text from the identified level. The content segment/summary segment maps, as well as the hierarchical summary segment, may be stored and provided in, for example, XML or RDF formats. Note that the summary segments and the corresponding data structures may be created using automated methods as described in detail later, or by humans, either manually or using machine-aided tools, such as annotation utilities.

The method of FIG. 5 includes initializing text of a content summary (step 506). For example, the media summary generator 118 may initialize the text of a content summary for the text of the e-book 116 up to a bookmarked position. The text for a total content summary may be initialized to empty (i.e., no text). In another example, the media summary generator 118 may initialize the text of a content summary for the e-book 116 to a default string of text (e.g., "The story so far . . . "). Other summary text may be used for filling the total content summary, or may be appended to follow the default string of text, as will be described in the following example steps 508-516. For example, the content summaries for the chapters up to the bookmarked position may be used to complete the text of the total content summary after the default string of text.

Referring to step 508 of FIG. 5, the method includes fetching a next identified content segment. For example, the media summary generator 118 may fetch a first segment of the segments identified in step 502. Continuing the example of the e-book 116, the media summary generator 118 may fetch the first identified chapter.

At step 510 of FIG. 5, the method includes identifying one or more summary segments for the identified content segment. For example, the media summary generator 118 may use the content segment/summary segment map for identifying a summary segment for the identified content segment of step 508.

At step 512 of FIG. 5, the method includes ranking the identified summary segments of step 510. For example, if more than one summary segment was identified for the content segment, the media summary generator 118 may rank the summary segments based on one or more predefined criteria such as, for example, but not limited to, a distance of the identified content segment from a bookmarked position, a time since a corresponding content segment was read, a relevance of a content segment to a current bookmarked position, user profile information (e.g., a user's interest in the identified summary segment), and the like.

In the example of a content segment relevance, a relevancy level may be assigned to a content segment or other portion of the e-book. The content summary may be generated based on the relevancy level of the content segment. If the relevancy level of the content segment is higher than a threshold, a content summary of the segment may be generated. In contrast, if the relevancy level of the content segment is lower than a threshold, no content summary may be generated for the segment.

At step 514 of FIG. 5, the method includes selecting one or more top ranked, identified summary segments of step 512. The number of top ranked summary segments that are selected may be based upon, for example, but not limited to, a distance of the identified content segment from a bookmarked position, a time since a corresponding content segment was read, a relevance of a content segment to a current bookmarked position, user profile information (e.g., a user's interest in the identified summary segment), the like, or combinations thereof. In an example, the media summary generator 118 may select one or more top ranked identified summary segments.

At step 516 of FIG. 5, the method includes appending the selected top ranked, identified summary segments to the text of the content summary. For example, the media summary generator 118 may append selected top ranked, identified summary segments to the text of the content summary for the e-book 116. In an embodiment, the media summary generator 118 may insert some other text or apply formatting to the selected summary segment before appending to the content summary, such as, for example, the chapter number or page numbers for the content segment to which the selected summary segment corresponds. If the necessary information is available, the media summary generator 118 may also insert pre-determined text segments that indicate a relation between the previously selected and currently selected summary segment. As an example, a time-based relation indicating the passage of time between consecutive selected summary segments may be indicated by inserting the phrase "Several years later . . . " between the segments.

At step 518 of FIG. 5, the method includes determining whether there are more identified content segments. For example, the media summary generator 118 may determine whether there are more identified content segments. In response to determining that there are more identified content segments, the method may proceed to step 508 to fetch the next identified content segment for identifying one or more summary segments for the identified content segment (step 510), ranking identified summary segments (step 512), selecting top ranked identified summary segments (step 514), and appending the selected identified summary segments to the text of the content summary (step 516). Steps 508-518 may be performed iteratively until there are no more identified segments. In response to determining that there are no more identified content segments at step 518, the method may proceed to step 520.

At step 520 of FIG. 5, the method includes formatting text of the content summary. For example, the formatting may include editing the text into correct grammatical format. The media summary generator 118 may format text of the content summary. An example of formatting may be to adjust the font characteristics, or insert spaces of paragraph breaks after certain summary segments to be more visually appealing. Alternatively, the media summary generator 118 may insert an ellipsis between certain summary segments to indicate, for example, non-continuity, or at the end of the content summary to indicate incompleteness. As another example, if the content is an opinion piece, certain segments may be prefaced with the words "In the author's opinion". In one embodiment, the generator 118 may parse the summary to identify any context specific words and filter them or replace with ellipses to preserve consistency. For example, in an extracted summary segment "On the following Thursday, Bob proposed to Alice," the day of the week may be contextually irrelevant or confusing, and hence may be removed such that the segment becomes "Bob proposed to Alice." In another embodiment, the generated summary may be parsed and converted into a different form, for example, to a different tense more suited for a summary, or a subset of segments may be converted to a different tense, for example, to maintain a consistent tense throughout the summary. In one embodiment, this may be performed by using a parts-of-speech tagger to tag each word with the corresponding parts of speech, such as nouns, verbs, adjectives and adverbs; using a stemmer to stem the tagged words; and using a natural language generator (NLG) to generate a sentence from the stemmed tagged words in a given format. As an example, conversion to a different tense may be performed by using a parts-of-speech tagger on the words to identify verbs from a segment; using a stemmer to obtain the stem of those extracted verbs; using a natural language generator to conjugate the stemmed extracted verbs with the desired tense; and re-inserting the conjugated stemmed extracted verbs into the segment. It is noted that the formatting and other post-processing may also depend on the type of content, the user profile, and the like.

At step 522 of FIG. 5, the method includes presenting the content summary to a user. For example, the media summary generator 118 may control the user interface 110 to display text of the content summary.

Figure 6:
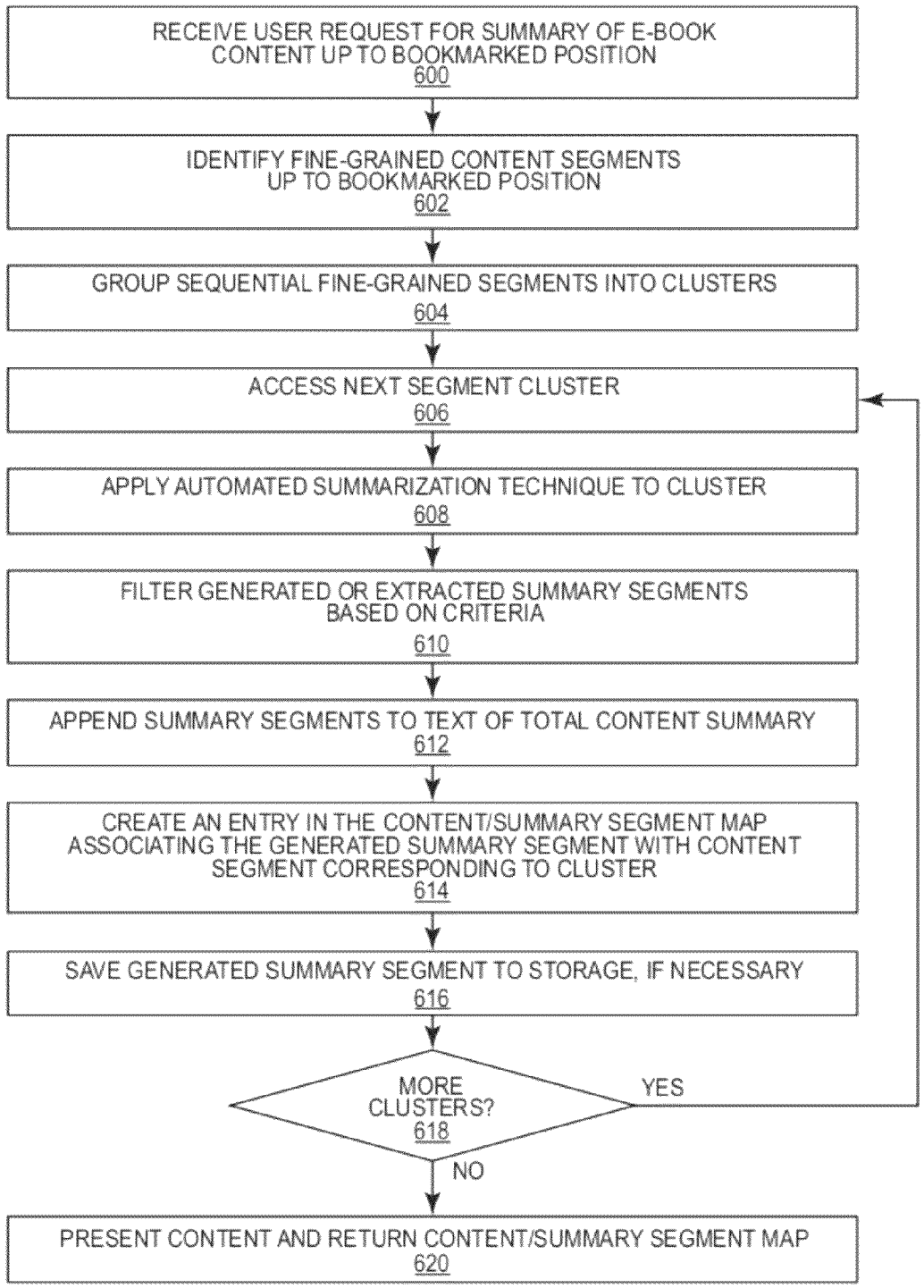
FIG. 6 is a flow chart of an exemplary method for generating a bookmark-based content summary using automatic summarization of dynamically-sized clusters of content segments in accordance with embodiments of the present disclosure.

In accordance with embodiments of the present disclosure, FIG. 6 illustrates a flow chart of an exemplary method for generating a bookmark-based content summary using automatic summarization of dynamically-sized clusters of content segments. The method of FIG. 6 is described with respect to the system 100 shown in FIG. 1, although the method may be implemented by any suitable system or electronic device. The steps of FIG. 6 may be implemented entirely, or in part, by a media summary generator 118 residing on one of the e-book readers 102 shown in FIG. 1. The media summary generator 118 may be implemented by software, hardware, firmware, or combinations thereof.

Referring to FIG. 6, the method includes receiving a user request for a content summary of e-book content up to a bookmarked position (step 600). For example, the user may input a command into the user interface 110 for requesting a content summary of the e-book 116 up to a bookmarked position. In an example, the user may select an icon on a page of the e-book 116 for requesting content summary. The media summary generator 118 may receive the command for requesting the content summary of the e-book 116 up to the identified position.

At step 602 of FIG. 6, the method includes identifying fine-grained content segments up to the bookmarked position. For example, one or more pages or chapters in the e-book 116 may precede a bookmarked page. In this example, the media summary generator 118 may identify pages and/or chapters preceding the bookmarked pages. At step 604, the method includes grouping sequential fine-grained content segments into clusters. For example, the media summary generator 118 may group adjacent or nearby pages and/or chapters of the e-book 116 into clusters.

In accordance with embodiments of the present disclosure, sizes of the clusters that are grouped together may be based on a distance of content segments from the bookmarked position. For example, pages and/or chapters that are positioned a greater distance from the bookmarked position may be placed together in larger clusters. For example, if the bookmarked position is at chapter 12 of the e-book 116, the media summary generator 118 may place chapters 1-5 together in a cluster, may place chapters 6-10 together in another cluster, and may place chapter 11 in yet another cluster.

The verbosity (e.g., detail and length) of a content summary may vary based on proximity of content to a bookmarked position. For example, summaries can be more detailed as summary portions of content are closer to the bookmarked position. Alternatively, for example, summaries may be less detailed as summary portions of content are closer to the bookmarked position. This example may be based on the premise that a reader may have forgotten more of earlier read content than the content closer to the bookmarked position. The distance from a bookmarked position to other portions of the e-book may be measured, for example, but not limited to, a number of media units (e.g., words, lines, pages, chapters, letters, and the like), estimated reading time, estimated reading time based on a user's reading speed, and combinations thereof.

As will be described in the following example steps 606-616, the clusters may each be used to generate a content summary of their respective content segment(s). These content summaries may be combined together for providing a total content summary up to the bookmarked position.

The method of FIG. 6 includes accessing a next cluster (step 606) and applying an automated summarization technique to the cluster (step 608). For example, the media summary generator 118 may access a first cluster for the e-book 116, which corresponds to chapters 1-5. A summarization technique may be applied to the content of chapters 1-5. For example, the media summary generator 118 may apply a semantic analysis technique, an NLP technique, a summary extraction technique, the like, or combinations thereof to the content of chapters 1-5. The resulting summarization of the content associated with the cluster may be referred to as a "summary segment."

At step 610 of FIG. 6, the method includes filtering the summary segments based on one or more criteria. For example, the media summary generator 118 may filter a generated or extracted summary segment based on criteria, such as, but not limited to, a distance of the content from a bookmarked position, a time since the e-book was last read, and the like. For example, if an extractive technique is used in constructing the summary segment, it ranks segments in the content, such as sentences, phrases and words, and extracts them for inclusion in the summary based on a function of the rank, for instance, by comparing to a threshold value. Before filtering these segments, the media summary generator 118 may adapt the rank using additional metrics such as distance from the bookmark position or time elapsed, by, for example, multiplying by a weighing factor that is directly proportional to the distance from the bookmark and the time elapsed. Thus, when compared to a threshold, summary segments for portions that are farther from the bookmark or have been read much more previously are more likely to be included in the summary than other segments.

At step 612 of FIG. 6, the method includes appending the summary segments to the text of the total content summary. For example, the media summary generator 118 may append the summary segments to the text of the total content summary for the e-book 116.

At step 614 of FIG. 6, the method includes creating an entry in a content/summary segment map for associating the summary segment with the content segment corresponding to the cluster. For example, the media summary generator 118 may access or, if a map for the e-book does not exist, create a content/summary segment map for the e-book 116. Further, in this example, the media summary generator 118 may create an entry in the map for mapping the generated summary segment with a corresponding cluster. Continuing the example of the e-book 116, the media summary generator 118 may create entries in a map for mapping summary segments for each of the clusters (e.g., clusters for chapters 1-5, chapters 6-10, and chapter 11) to identifiers for the corresponding content of the e-book 116.

At step 616 of FIG. 6, the method includes saving the summary segment to storage. For example, the media summary generator 118 may store the summary segment to the store 108 or any other suitable memory.

At step 618 of FIG. 6, the method includes determining whether there are more clusters. For example, the media summary generator 118 may determine whether there are more clusters for summarization. In response to determining that there are more clusters, the method may proceed to step 606 to access the next cluster for summarization (step 608), filtering (step 610), appending of the summary segment to the text of the content summary (step 612), creating a map entry (step 614), and saving of the summary segment (step 616). Steps 606-618 may be performed iteratively until there are no more clusters. In response to determining that there are no more clusters at step 618, the method may proceed to step 620.

At step 620 of FIG. 6, the method includes presenting the content summary and returning the map. In an embodiment, the media summary generator 118 may also format the summary before presentation as previously described for step 520 of FIG. 5. For example, the media summary generator 118 may control the user interface 110 to display text of the content summary. Further, for example, the map generated for the e-book 116 may be stored locally at store 108, or remotely at store 120.

Figure 7:
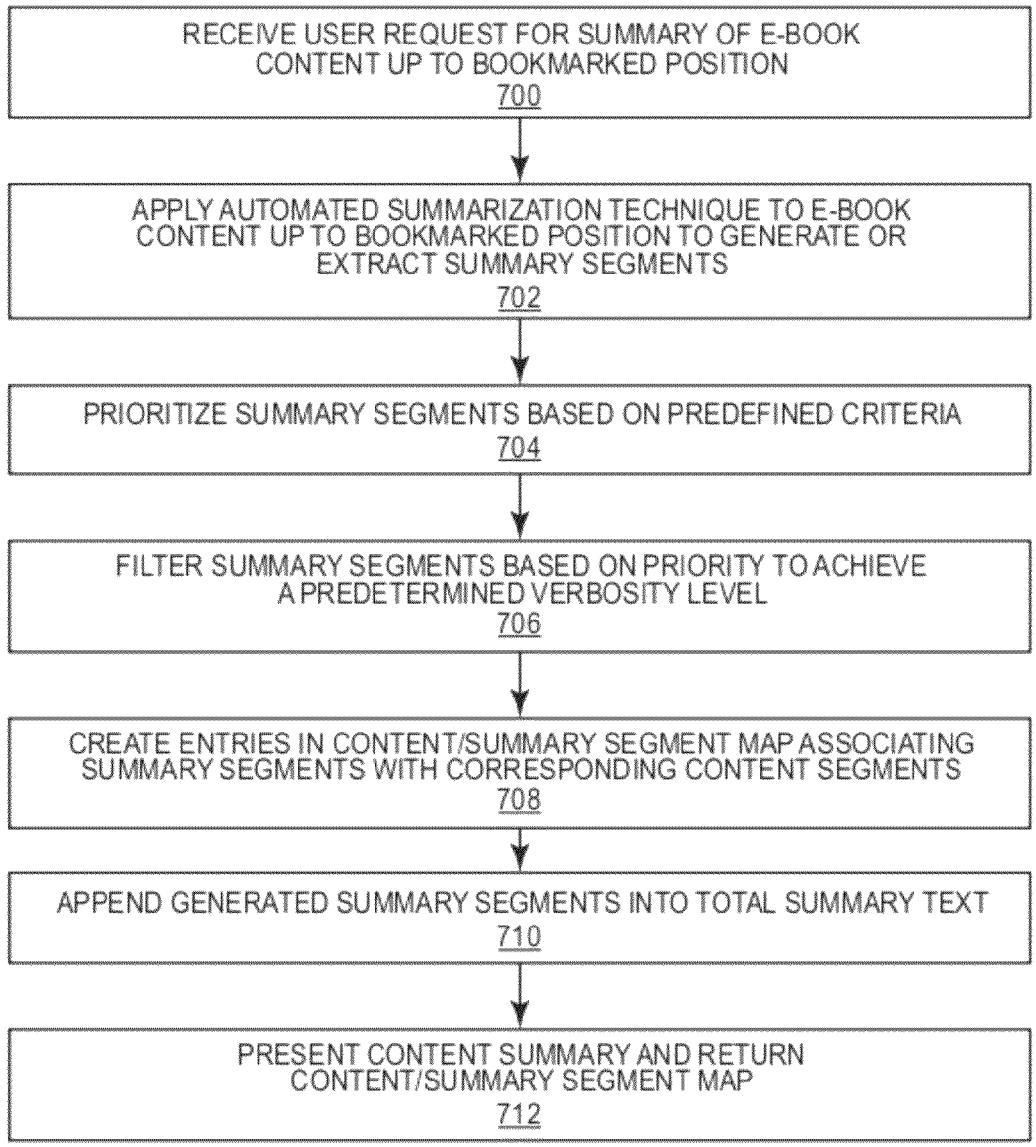
FIG. 7 is a flow chart of an exemplary method for generating a bookmark-based content summary using dynamic ranking and filtering of automatically generated summary segments in accordance with embodiments of the present disclosure.

In accordance with embodiments of the present disclosure, FIG. 7 illustrates a flow chart of an exemplary method for generating a bookmark-based content summary using dynamic ranking and filtering of automatically generated summary segments. The method of FIG. 7 is described with respect to the system 100 shown in FIG. 1, although the method may be implemented by any suitable system or electronic device. The steps of FIG. 7 may be implemented entirely, or in part, by a media summary generator 118 residing on one of the e-book readers 102 shown in FIG. 1. The media summary generator 118 may be implemented by software, hardware, firmware, or combinations thereof.

Referring to FIG. 7, the method includes receiving a user request for a content summary of e-book content up to a bookmarked position (step 700). For example, the user may input a command into the user interface 110 for requesting a content summary of the e-book 116 up to a bookmarked position. In an example, the user may select an icon on a page of the e-book 116 for requesting a content summary. The media summary generator 118 may receive the command for requesting the content summary of the e-book 116 up to the identified position.

At step 702 of FIG. 7, the method includes applying one or more automated summarization techniques to the e-book content up to the bookmarked position to generate or extract summary segments. For example, the media summary generator 118 may use a suitable summarization technique for summarizing chapters of the e-book 116. Each chapter summary may be a summary segment.

At step 704 of FIG. 7, the method includes prioritizing the summary segments based on one or more predefined criteria such as, for example, but not limited to, a distance of the identified content segment from a bookmarked position (e.g., content segments positioned closer to the bookmarked position have higher priority), a time since a corresponding content segment was read, a relevance of a content segment to an overall summary (e.g., summary segments having more keywords in common with the complete summary or the whole e-book have higher priority), and the like.

At step 706 of FIG. 7, the method includes filtering summary segments based on priority to achieve a predetermined verbosity level. For example, the media summary generator 118 may filter the summary segments. The verbosity level may depend on multiple criteria such as, but not limited to, distance from a bookmarked position, time since the corresponding content segment was last read, relevance, and the like.

At step 708 of FIG. 7, the method includes creating entries in a content/summary segment map for associating summary segments with corresponding content segments. These are the content segments from which the summary segments were generated or extracted from. For example, the media summary generator 118 may create entries in a map for mapping the generated summary segments with corresponding content segments. Continuing the example of the e-book 116, the media summary generator 118 may create entries in a map for mapping summary segments (e.g., chapter 1, chapter 2, and chapter 3) to identifiers for the corresponding chapters of the e-book 116.

At step 710 of FIG. 7, the method includes appending the summary segments to the text of the content summary. For example, the media summary generator 118 may append the summary segments to the text of the content summary for the e-book 116.

At step 712 of FIG. 7, the method includes presenting the content summary and returning the map. In an embodiment, the media summary generator 118 may also format the summary before presentation as previously described for step 520 of FIG. 5. For example, the media summary generator 118 may control the user interface 110 to display text of the content summary. Further, for example, the map generated for the e-book 116 may be stored locally at store 108, or remotely at store 120.

Figure 8:
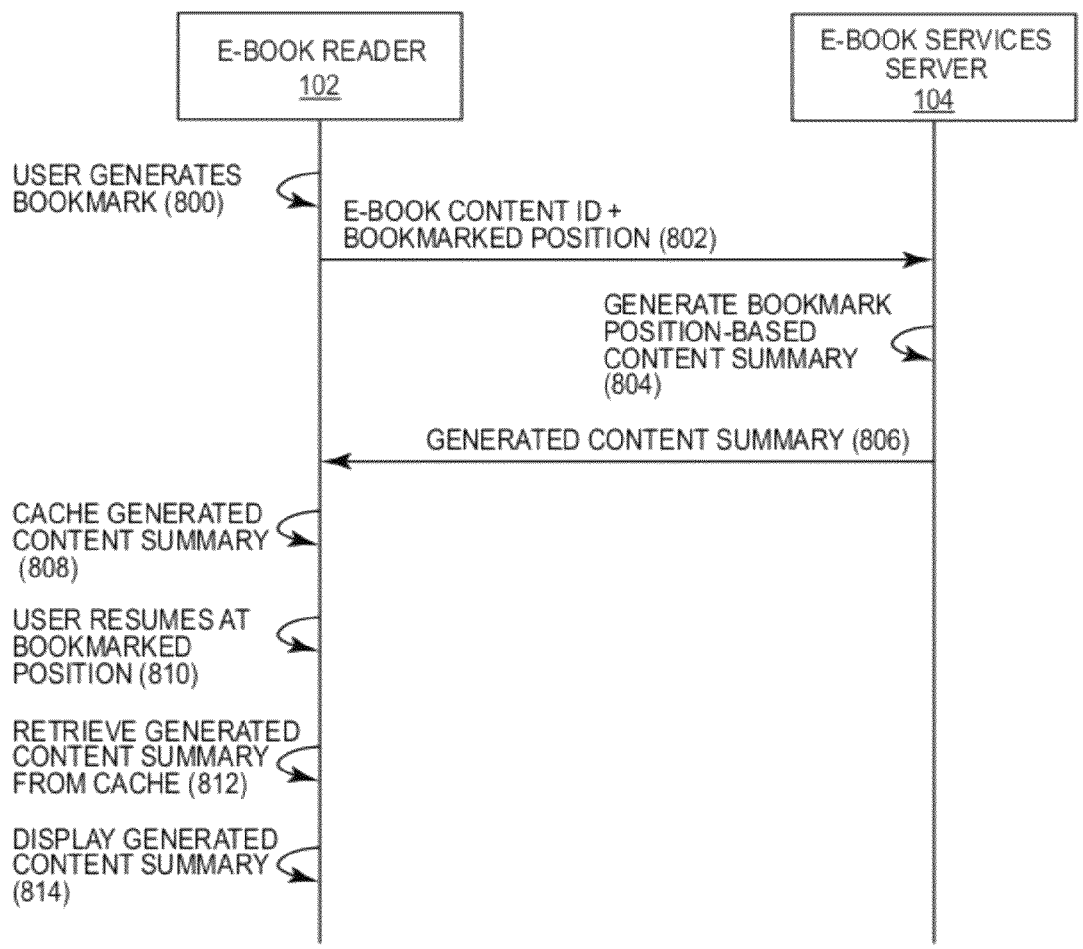
FIG. 8 is a message flow diagram of an exemplary operation of the system of FIG. 1 for providing a content summary to an e-book reader according to embodiments of the present disclosure.

In accordance with embodiments of the present disclosure, a content summary may be generated at an e-book services server in response to a request from an e-book reader or other electronic device. For example, FIG. 8 illustrates a message flow diagram of an exemplary operation of the system of FIG. 1 for providing a content summary to the e-book reader 102 according to embodiments of the present disclosure. Referring to FIG. 8, the e-book reader 102 may generate a bookmark in an e-book (step 800). In response to generation of the bookmark, an e-book content identifier for the e-book and an identifier for the bookmarked position within the e-book may be communicated to the e-book services server 104 (step 802). The identifiers may be communicated to the server 104 in a request message via a suitable network connection. In response to receipt of the identifiers, the server 104 may generate a bookmark position-based content summary in accordance with embodiments of the present disclosure (step 804). The generated content summary may be communicated to the e-book reader 102 (step 806). The e-book reader 102 may cache the generated content summary (step 808). Later, the e-book reader 102 may be opened at the bookmarked position when the user later resumes reading the e-book (step 810). In response to opening the e-book at the bookmarked position, the generated content summary for the bookmarked position may be retrieved from cache (step 812) and displayed to the user (step 814).

Figure 9:
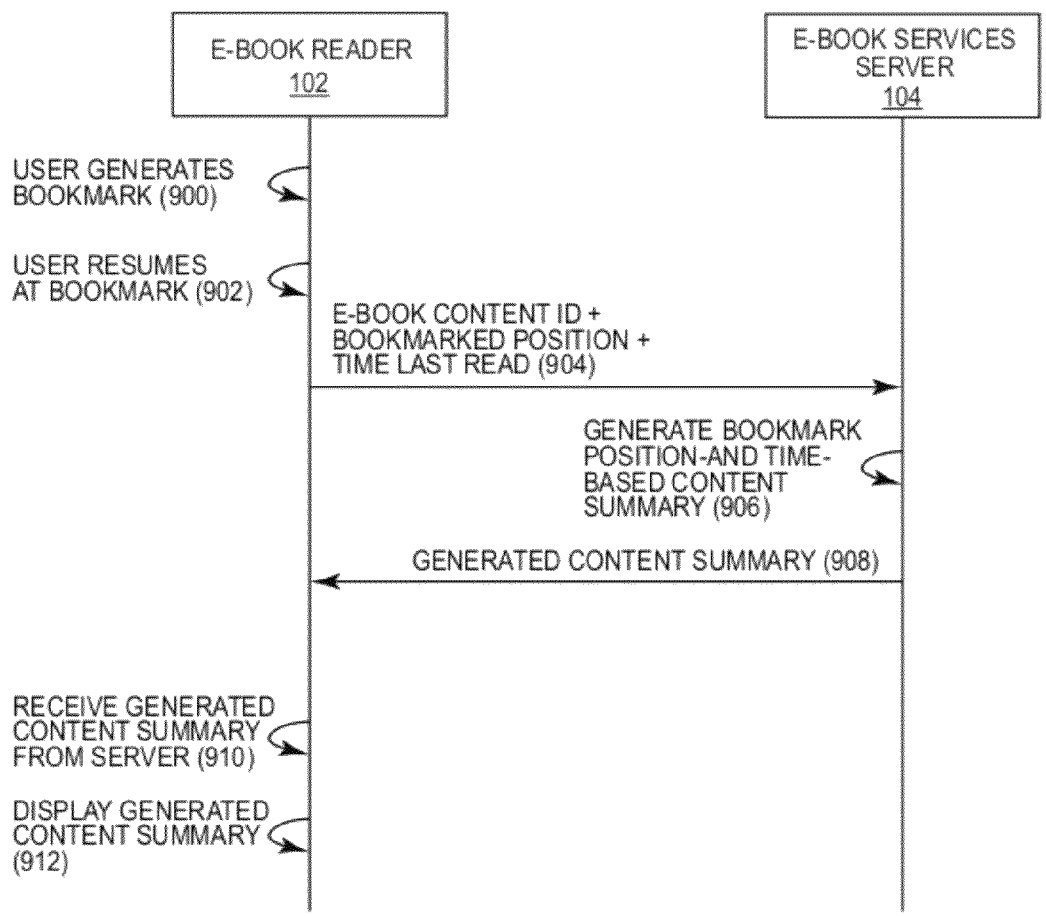
FIG. 9 is a message flow diagram of another exemplary operation of the system of FIG. 1 for providing a content summary to an e-book reader according to embodiments of the present disclosure.

In another example of generating a content summary at an e-book services server in response to a request from an e-book reader or other electronic device, FIG. 9 illustrates a message flow diagram of another exemplary operation of the system of FIG. 1 for providing a content summary to the e-book reader 102 according to embodiments of the present disclosure. Referring to FIG. 9, the e-book reader 102 may generate a bookmark in an e-book (step 900). The user may then close the e-book. Later, the e-book reader 102 may be opened at the bookmarked position when the user later resumes reading the e-book (step 902). In response to opening the e-book at the bookmarked position, an e-book content identifier for the e-book, an identifier for the bookmarked position within the e-book, and the time when the e-book was last read may be communicated to the e-book services server 104 (step 904). The identifiers and time may be communicated to the server 104 in a request message via a suitable network connection. In response to receipt of the identifiers and time, the server 104 may generate a bookmark position-based content summary in accordance with embodiments of the present disclosure (step 906). The generated content summary may be communicated to the e-book reader 102 (step 908). The e-book reader 102 may receive the generated content summary (step 910). In response to receipt of the content summary, the content summary for the bookmarked position may be displayed to the user (step 912).

In accordance with embodiments of the present disclosure, a navigation link may be presented for linking a portion of a content summary and a corresponding portion of a media item. For example, a navigation link, such as a hyperlink, may link a displayed portion of a content summary to the portion of an e-book that is summarized by the portion of the content summary. Conversely, a hyperlink may be displayed along with a portion of the e-book for linking the e-book portion to its corresponding portion in the content summary. For example, if chapters of an e-book are summarized by a content summary, the content summary may include multiple navigation links that link to corresponding chapters of the e-book. In response to selection of a navigation link, the linked-to portion may be displayed or otherwise presented to the user.

Content of an e-book may be summarized by any suitable summarization technique. For example, content may be summarized by an automated extractive technique (e.g., keyphrase extraction, text mining, and the like). In another example, content may be summarized by an automated abstractive technique. In another example, content may be summarized by a human. Further, for example, content summarization may be implemented by a combination of any summarization technique described herein.

In an example use of an e-book according to an embodiment of the present disclosure, a user may read an e-book and close the e-book. When the e-book is closed, the position at which the book is closed may be bookmarked. A content summary may be generated based on the bookmarked position in accordance with embodiments of the present disclosure. After later opening the e-book, the user may select a bookmark icon to control the e-book to display the content summary. The content summary may be selectively adapted by the user by adjusting weights for different subjects or characters, the length of each summary, and the like. For example, the summary may focus on subjects or characters given greater weight by the user. The user may also set an amount of content to be summarized (e.g., 10 pages) and/or a length of a content summary (e.g., 1 paragraph). In response to the settings, the content summary may be generated in accordance with the setting constraints. The content summary may be generated based on an NLP technique, a semantic analysis technique, and/or another suitable summarization technique. In another example, a full-length summary of content of an e-book may be truncated based on a bookmarked position or other identified position.

In another example use of an e-book according to an embodiment of the present disclosure, a user may enter input into the e-book for track information about his or her reading of an e-book. For example, the user may select an "intelligent bookmark" icon to access information about the e-book. The intelligent bookmark can provide contextually relevant information about the e-book, or section of the e-book, that has been read. Selection of the intelligent bookmark can control the e-book to display or otherwise present the following example information: how much time the user has spent at a current reading session; how much time the user has spent reading the entire e-book; a current reading speed (e.g., words per minute); an estimate on how long to read the remainder of the e-book (e.g., based on a current reading speed and a length of the remainder of the e-book); significant characters in this section (also, with intelligently indexed links to other references of these characters that are navigable); and significant objects in a current section (with intelligently indexed links to other references of these subjects that are navigable).

Figure 10:
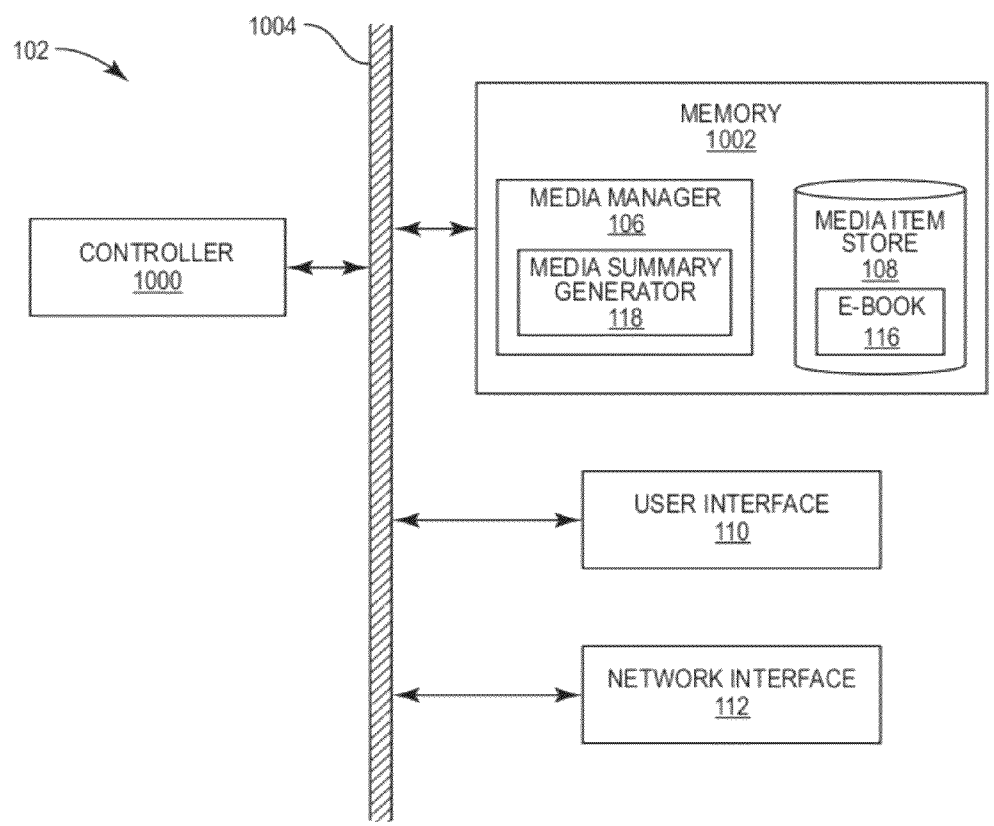
FIG. 10 is a block diagram of the e-book reader shown in FIG. 1 according to embodiments of the present disclosure.

FIG. 10 illustrates a block diagram of the e-book reader 102 shown in FIG. 1 according to embodiments of the present disclosure. Referring to FIG. 10, the e-book reader 102 may include a controller 1000 connected to a memory 1002, the user interface 110, and the network interface 112 by a bus 1004 or similar mechanism. The controller 1000 may be a microprocessor, digital ASIC, FPGA, or the like. In this example, the controller 1000 is a microprocessor, and the media manager 106 and media summary generator 118 are implemented in software and may be stored in the memory 1002 for execution by the controller 1000. The memory 1002 may also store the media item store 108 and the e-book 116. The user interface 110 may include, for example, a touchscreen, a display, one or more user input components (e.g., a keypad), a speaker, or the like, or any combination thereof. The network interface 112 may be a local wireless interface such as a wireless interface operating according to one of the suite of IEEE 802.11 standards, a mobile communications interface such as a cellular telecommunications interface, or the like.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed invention. When implemented on a general-purpose processor, the program code combines with the processor to provide a unique apparatus that operates to perform the processing of the presently disclosed invention.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
   using at least a processor and memory for:
   receiving identification of a position within a media item residing on an electronic device, wherein receiving identification of the position comprises receiving identification of the position of the media item that is being presented when the media item closes;
   determining an indication of a time elapsed since the media item was last accessed;
   retrieving a mapping that maps pre-generated summarization to the position within the media item;
   generating a content summary for a portion of the media item based on the identified position, the elapsed time, and the pre-generated summarization; and presenting the content summary,
   wherein generating the content summary comprises:
   retrieving the pre-generated summarization of the media item; and
   truncating the pre-generated summarization based on the position within the media item, wherein presenting the content summary comprises presenting the truncated pre-generated summarization.

2. The method of claim 1, wherein receiving identification of the position comprises receiving user input that controls an application to bookmark the position within the media item.

3. The method of claim 1, further comprising receiving user input that controls an application to close the media item while the application is presenting the media item at or near the position within the media item.

4. The method of claim 1, wherein receiving identification of the position comprises receiving identification of a position within text of the media item.

5. The method of claim 1, wherein generating the content summary comprises:
   determining a portion of the media item residing between a beginning of the media item and the identified position; and
   using the determined portion to generate the content summary.

6. The method of claim 5, wherein determining the portion of the media item comprises determining a size of the portion of the media item based on the elapsed time.

7. The method of claim 1, wherein the portion of the media item contains a portion of the media item residing between a beginning of the media item and the identified position.

8. The method of claim 7, wherein generating the content summary comprises using at least one of semantic analysis and natural language processing (NLP) techniques to summarize the portion of the media item.

9. The method of claim 7, further comprising receiving user input that controls an application to open the media item at the position,
   wherein generating the content summary comprises dynamically generating the content summary for the portion of the media item in response to receiving user input to control the opening of the media item at the position.

10. The method of claim 1, wherein truncating the pre-generated summarization comprises identifying a portion of the pre-generated summarization that corresponds to the identified position,
    wherein presenting the truncated pre-generated summarization comprises presenting the identified portion of the pre-generated summarization.

11. The method of claim 1, wherein the mapping includes a summary hierarchy having varying levels of summary detail.

12. The method of claim 1, further comprising receiving user input that controls an application to open the media item,
    wherein presenting the content summary comprises presenting the content summary to in response to receiving user input to control the opening of the media item.

13. The method of claim 1, wherein presenting the content summary comprises using a display of the electronic device to display the content summary.

14. The method of claim 13, further comprising using the display of the electronic device to display content of the media item at or near the position when displaying the content summary.

15. The method of claim 1, further comprising receiving user-specific information, wherein generating a content summary comprises generating the content summary based on the user-specific information.

16. The method of claim 15, wherein receiving user-specific information comprises receiving at least one of a profile of a user, gaze-tracking information for the user, annotations of the user, and social network information of the user.

17. The method of claim 1, further comprising assigning a relevancy level to portions of the media item, and
wherein generating the content summary comprises generating the content summary based on the relevancy level of portions of the media item.

18. The method of claim 17, wherein generating the content summary based on the relevancy level comprises including a portion of the media item in the content summary based on the relevancy level of the portion.

19. The method of claim 1, wherein generating the content summary comprises generating at least one mapping that maps the content summary to at least one portion of the media item that is relevant to the content summary.

20. The method of claim 1, wherein generating the content summary comprises generating first and second content summaries for the identified position within the media item, wherein the first content summary includes a greater amount of description than the second content summary,
wherein the method further comprises receiving input for selecting the first content summary or the second content summary for presentation, and
wherein presenting the content summary comprises presenting the selected first or second content summary.

21. The method of claim 20, wherein receiving input comprises receiving one of user input and elapsed time since the accessed the media item was last accessed.

22. The method of claim 1, further comprising:
generating a navigation link between at least a portion of the content summary and a corresponding portion of the media item; and
presenting the navigation link.

23. The method of claim 22, further comprising:
receiving user input for selecting the navigation link; and
in response to receiving the user input, presenting the corresponding portion of the media item.

24. A system comprising:
a media summary generator comprising at least a processor and memory and configured to:
receive identification of a position within a media item residing in memory, wherein receiving identification of the position comprises receiving identification of the position of the media item that is being presented when the media item closes;
determine an indication of a time elapsed since the media item was last accessed;
retrieve a mapping that maps pre-generated summarization to the position within the media item; and
generate a content summary for a portion of the media item based on the identified position, the elapsed time, and the pre-generated summarization; and
a user interface configured to present the content summary,
wherein generating the content summary comprises:
retrieving the pre-generated summarization of the media item; and
truncating the pre-generated summarization based on the position within the media item, wherein presenting the content summary comprises presenting the truncated pre-generated summarization.

25. A computer-readable non-transitory storage medium having stored thereon computer executable instructions for performing the following steps:
receiving identification of a position within a media item residing on an electronic device, wherein receiving identification of the position comprises receiving identification of the position of the media item that is being presented when the media item closes;
determining an indication of a time elapsed since the media item was last accessed;
retrieve a mapping that maps pre-generated summarization to the position within the media item;
generating a content summary for a portion of the media item based on the identified position, the elapsed time, and the pre-generated summarization; and
presenting the content summary of the electronic device,
wherein generating the content summary comprises:
retrieving the pre-generated summarization of the media item; and
truncating the pre-generated summarization based on the position within the media item, wherein presenting the content summary comprises presenting the truncated pre-generated summarization.

* * * * *